Patented May 1, 1934

1,957,092

UNITED STATES PATENT OFFICE 1,957,092

PROCESS OF PREPARING HYDROXYPHENYLAMINOPROPANOLS

Max Bockmühl, Gustav Ehrhart, and Leonhard Stein, Frankfort-on-the-Main, Germany, assignors to Winthrop Chemical Company, Inc., New York, N. Y., a corporation of New York No Drawing. Application November 19, 1932, Serial No. 643,520. In Germany May 21, 1930

9 Claims. (Cl. 260—128.5)

The present invention relates to a process of preparing hydroxyphenylaminopropanols.

We have found that hydroxyphenylaminopropanols may be prepared by causing a halogen to act upon a compound of the following formula:

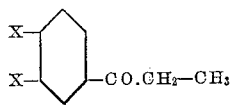

wherein at least one X stands for the group: $O-CH_2-C_6H_5$, the remaining X for hydrogen, then causing dibenzylamine to act upon the halogenated compound thus obtained and reducing the 2-dibenzylaminopropiophenone thus obtained with hydrogen in the presence of a noble metal catalyst.

The noble metal catalyst, for instance platinum or palladium, may be applied in a finely divided form or in the form of its oxide. Among the agents, known to bind acids, there may be mentioned metal carbonates and metal oxides such as calcium carbonate, sodium bicarbonate, barium carbonate, magnesium oxide, zinc oxide or the like.

The products obtainable by the process of this invention are remedies, or intermediate products for the manufacture of therapeutically valuable substances.

The following examples illustrate the invention:

1. 34.6 grams of 3.4-dibenzyloxypropiophenone are dissolved in 300 cc. of methylene chloride; 12 grams of calcium carbonate are added to the solution and 16 grams of bromine are then entered drop by drop, while stirring. As soon as the reaction is complete, the calcium compounds are eliminated by filtering with suction and the methylene chloride solution is entirely evaporated. On cooling, the 3.4-dibenzyloxybromopropiophenone crystallizes from the residue; it is recrystallized from hexahydrobenzene or alcohol and then melts at 93° C. to 94° C.

40 grams of 3.4-dibenzyloxybromopropiophenone are dissolved in 100 cc. of benzene; 36 grams of dibenzylamine are added to the solution and the mixture is heated in a reflux apparatus and on a water bath for about 6 hours. After several hours' standing, the dibenzylamine-hydrobromide which has separated is eliminated by filtering with suction and the filtrate is completely freed from benzene. The residue is dissolved in ether, the solution so obtained is washed with a small quantity of water and then dried by means of sodium sulfate. Hydrochloric acid gas is introduced into the dried solution until an acid reaction is obtained. The hydrochloride which crystallizes is separated by filtering with suction and suspended in water. By an addition of ammonia the base is again set free, and is dissolved in ether. The solution is dried over sodium sulfate and the ether is distilled. The 3.4-dibenzyloxydibenzylaminopropiophenone soon crystallizes. It is recrystallized from methanol and then melts at 84° C. to 86° C. The hydrochloride is obtained by neutralizing the base with the calculated quantity of alcoholic hydrochloric acid.

10 grams of 3.4-dibenzyloxydibenzylaminopropiophenone hydrochloride are dissolved in 250 cc. of alcohol and hydrogenated with hydrogen in the presence of a palladium catalyst. When the calculated quantity of hydrogen has been absorbed, the catalyst is removed by filtering with suction and the alcoholic solution is evaporated to dryness in a vacuum. By recrystallizing the residue from a mixture of methanol and acetone, the 3.4-dihydroxyphenylaminopropanol hydrochloride is obtained melting at 178° C. The reaction proceeds according to the following equations:

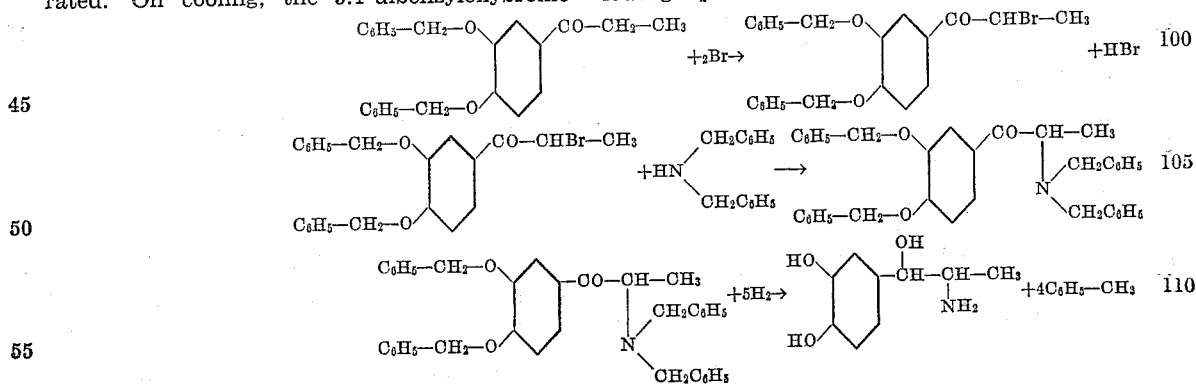

2. 48 grams of para-benzyloxypropiophenone are dissolved in 400 cc. of carbon tetrachloride, there are added 25 grams of calcium carbonate and then 200 grams of carbon tetrachloride containing 14 grams of chlorine in a dissolved state. After a short time the chlorination is complete. The liquid is freed from the precipitate by filtration and washed with a dilute sodium bicarbonate solution and water. The carbon tetrachloride solution is dried by means of sodium sulfate and concentrated under strongly reduced pressure. The residue obtained is parabenzyloxychloropropiophenone which solidifies after some time in a crystaline state. 27 grams of the chloro compound are dissolved in 50 cc. of alcohol and the solution is mixed with 39 grams of distilled dibenzylamine. The mixture is allowed to stand over-night and the dibenzylamine hydrochloride which has formed is precipitated by an addition of ether. The mass is filtered by suction and subsequently washed with ether. The solution in ether is washed with water, dried with the aid of sodium sulfate and concentrated in a vacuum. The residue is stirred with a low-boiling petroleum ether. The portion which is insoluble in petroleum ether is neutralized with alcoholic hydrochloric acid, diluted with alcohol and hydrogenated with hydrogen in the presence of a palladium catalyst. The compound obtained by the reduction is para-hydroxyphenylaminopropanol hydrochloride which, after recrystallization from methanol and ether, melts at 207° C.

3. 20 grams of meta-benzyloxypropiophenone are dissolved in 200 cc. of methylene chloride and 4.8 cc. of bromine are added to the solution drop by drop, while stirring. As soon as the coloration of bromine has disappeared, the methylene chloride solution is washed with a sodium bicarbonate solution and water. The liquid is dried by means of sodium sulfate and concentrated in a vacuum. The residue is meta-benzyloxybromopropiophenone. 32 grams of the compound obtained are dissolved in 50 cc. of alcohol and the solution is mixed with 39 grams of dibenzylamine. After several hours' standing, the reaction is complete. By a addition of ether, the dibenzylamine hydrobromide formed by the reaction is precipitated and filtered by suction. The ethereal solution is washed with water, dried over sodium sulfate and evaporated. The residue is stirred with a low-boiling petroleum ether. The product which is insoluble in petroleum ether is neutralized with alcoholic hydrochloric acid and hydrogenated with hydrogen in an alcoholic solution in the presence of a palladium catalyst. When the absorption of hydrogen is complete, the catalyst is removed by filtration and the alcoholic solution is concentrated in a vacuum. The residue is meta-hydroxyphenyl-aminopropanol hydrochloride which, after recrystallization from propyl alcohol and ether, melts at 178° C.

We claim:

1. In the process of preparing hydroxy-phenyl-amino-propan-ols the steps which comprise causing a halogen to act upon a compound of the following formula:

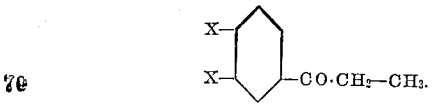

wherein one X stands for the group —O—CH$_2$—C$_6$H$_5$, and the remaining X for hydrogen or the group —O—CH$_2$—C$_6$H$_5$, then causing dibenzylamine to act upon the halogenated compound and reducing the 2-dibenzylamino-propiophenone thus obtained with hydrogen in the presence of a noble metal catalyst.

2. In the process of preparing hydroxy-phenyl-amino-propan-ols the steps which comprise causing a halogen to act upon a compound of the following formula:

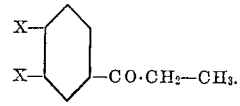

wherein one X stands for the group —O—CH$_2$—C$_6$H$_5$, and the remaining X for hydrogen or the group —O—CH$_2$—C$_6$H$_5$, in the presence of a known acid binding agent, then causing dibenzylamine to act upon the halogenated compound and reducing the 2-dibenzylaminopropiophenone thus obtained with hydrogen in the presence of a noble metal catalyst.

3. In the process of preparing hydroxy-phenyl-amino-propan-ols the steps which comprise causing bromine to act upon a compound of the following formula:

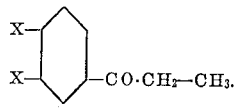

wherein one X stands for the group —O—CH$_2$—C$_6$H$_5$, and the remaining X for hydrogen or the group —O—CH$_2$—C$_6$H$_5$, then causing dibenzylamine to act upon the brominated compound and reducing the 2-dibenzylaminopropiophenone thus obtained with hydrogen in the presence of a noble metal catalyst.

4. In the process of preparing hydroxy-phenyl-amino-propan-ols the steps which comprise causing bromine to act upon a compound of the following formula:

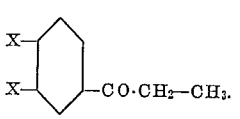

wherein one X stands for the group —O—CH$_2$—C$_6$H$_5$, and the remaining X for hydrogen or the group —O—CH$_2$—C$_6$H$_5$, in the presence of a known acid binding agent, then causing dibenzylamine to act upon the brominated compound and reducing the 2-dibenzylaminopropiophenone thus obtained with hydrogen in the presence of a noble metal catalyst.

5. In the process of preparing hydroxy-phenyl-amino-propan-ols the steps which comprise causing bromine to act upon a compound of the following formula:

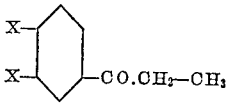

wherein one X stands for the group

—O—CH$_2$—C$_6$H$_5$, and the remaining X for hydrogen or the group —O—CH$_2$—C$_6$H$_5$, in the presence of calcium carbonate, then causing dibenzylamine to act upon the brominated compound and reducing the 2-dibenzylaminopropiophenone thus obtained with hydrogen in the presence of a noble metal catalyst.

6. In the process of preparing hydroxy-phenyl-amino-propan-ols the steps which comprise causing bromine to act upon a compound of the following formula:

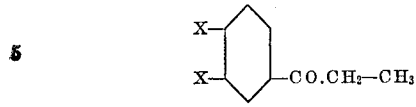

wherein one X stands for the group

—O—CH$_2$—C$_6$H$_5$, and the remaining X for hydrogen or the group —O—CH$_2$—C$_6$H$_5$, in the presence of calcium carbonate, then causing dibenzylamine to act upon the brominated compound and reducing the 2-dibenzylaminopropiophenone thus obtained with hydrogen in the presence of a palladium catalyst.

7. In the process of preparing 3.4-dihydroxyphenyl-amino-propanol the steps which comprise causing bromine to act upon 3.4-dibenzyloxypropiophenone in the presence of calcium carbonate, then causing dibenzylamine to act upon the resulting 3.4-dibenzyloxybrompropiophenone and reducing the 3.4-dibenzyloxy-dibenzylaminopropiophenone thus obtained with hydrogen in the presence of a palladium catalyst.

8. In the process of preparing 3-hydroxyphenylaminopropanol the steps which comprise causing bromine to act upon 3-benzyloxypropiophenone in the presence of sodium bicarbonate, then causing dibenzylamine to act upon the resulting 3-benzyloxybrompropiophenone and reducing the 3-benzyloxydibenzylaminopropiophenone thus obtained with hydrogen in the presence of a palladium catalyst.

9. In the process of preparing 4-hydroxyphenylaminopropanol the steps which comprise causing bromine to act upon 4-benzyloxypropiophenone in the presence of calcium carbonate, then causing dibenzylamine to act upon the resulting 4-benzyloxybrompropiophenone and reducing the 4-benzyloxydibenzylaminopropiophenone thus obtained with hydrogen in the presence of a palladium catalyst.

MAX BOCKMÜHL.
GUSTAV EHRHART.
LEONHARD STEIN.